United States Patent

[11] 3,607,384

[72] Inventor Frank D. Banks
Dahlgren, Va.
[21] Appl. No. 744,116
[22] Filed July 11, 1968
[45] Patented Sept. 21, 1971
[73] Assignee Western Electric Company, Incorporated
New York, N.Y.

[54] THIN-FILM RESISTORS HAVING POSITIVE RESISTIVITY PROFILES
2 Claims, 2 Drawing Figs.

[52] U.S. Cl. .......... 117/215, 117/106, 204/192, 338/308
[51] Int. Cl. .......... B44d 1/18
[50] Field of Search .......... 117/215, 217, 106, 107; 204/192; 338/308

[56] References Cited
UNITED STATES PATENTS

| | | | |
|---|---|---|---|
| 3,486,931 | 12/1969 | Dreyfus | 338/308 |
| 3,242,006 | 3/1966 | Gerstenberg | 204/192 X |
| 3,472,691 | 10/1969 | Kooy et al. | 117/107 X |

*Primary Examiner*—Alfred L. Leavitt
*Assistant Examiner*—C. K. Weiffenbach
*Attorneys*—H. J. Winegar, R. P. Miller and J. L. Landis

ABSTRACT: A thin-film resistor is provided having variable or nonhomogeneous resistivity which varies in a positive resistivity profile from the substrate to the film surface such that the resistivity at the surface of the thin-film is higher than the resistivity of the film adjacent to the substrate. Thin-film resistors, such as of tantalum nitride having a resistivity which varies either progressively or stepwise in a positive resistivity profile are obtained by (a) decreasing the voltage from one level to a lower level during sputtering, and/or (b) increasing the nitrogen concentration from one level to a higher level during vacuum deposition.

INVENTOR.
Frank D. Banks
BY J. L. Landis
ATTORNEY

THIN-FILM RESISTORS HAVING POSITIVE RESISTIVITY PROFILES

BACKGROUND OF THE INVENTION

The present invention relates to thin-film resistors having variable or nonhomogeneous resistivity. More particularly, this invention relates to thin-film resistors having a resistivity which varies in a positive resistivity profile from a low resistivity at the substrate to a higher resistivity at the surface of the film and to methods of making thin-film resistors having variable resistivity with a positive resistivity profile.

In recent years, there has been an unprecedented demand for electronic systems having increased reliability and performance coupled with decreased cost, size and weight. These requirements are met by thin-film circuits, which possess a higher volumetric efficiency or packing density than conventional circuits or printed circuits with conventional components. A thin-film circuit is a combination of electronic components with associated interconnections fabricated on a common substrate. Typically, a plurality of film-type, passive electrical components, such as resistors and capacitors, are formed using photolithographic processes over a resistive film such as tantalum nitride. Termination pads and interconnections are generated simultaneously from additional films of conductive materials which have been deposited on the substrate by a "vacuum deposition" technique, such as evaporation or sputtering. The principal difference between these techniques is that, while thermal energy is used in evaporation procedures for evaporating the coating material, high voltage ion bombardment of the coating material, causing ejection of atoms, is used for sputtering. Thus, thin-films of more refractory materials may be deposited by sputtering.

The cathode sputtering process uses a low pressure glow discharge maintained between two electrodes. The cathode, made from the material to be deposited, is bombarded by positively charged gas ions, usually argon. Atoms of cathode material are ejected and deposited on suitably located substrates. Normally, sputtering is accomplished by establishing predetermined pressure, voltage and current conditions and varying the time of sputtering to produce a film of desired sheet resistivity having substantially homogeneous characteristics.

Mask, silk-screen or photoresist techniques are used to define the conductive film patterns. Further processing removes the unwanted film and resist material. The result is a circuit complete with components, interconnections and termination paths for making external connections. The circuit elements are adjusted to value by chemical and thermal processes, which for example oxidize a tantalum nitride film, so that the precision of the component is held to within a fraction of 1 percent. Further details on the manufacture and processing of thin-film circuits are disclosed in an article by McLean et al., entitled "Tantalum-Film Technology," Proceedings of the IEEE, Vol. 52, No. 12, Dec., 1964, pages 1450–1462.

Before the design of a thin-film resistor can begin, it is necessary to choose the most appropriate film and substrate material for the particular application under consideration. Tantalum is a particularly useful material since it is relatively stable and has medium resistivity. Other suitable materials, used in vacuum deposition procedures, include aluminum, chromium, nickel, platinum, tin, titanium, gold, copper, cadmium and platinum, as well as mixtures of these materials, In some instances, metal compounds are preferred, such as tantalum nitride used in the manufacture of thin-film resistors, as in the patent to D. Gerstenberg No. 3,242,006.

The selection of a suitable substrate, which must be dimensionally stable at 400° C. in a vacuum, is also important to the manufacture of thin-film devices. The most significant characteristics of substrates are (1) surface smoothness, (2) proper chemical composition, and (3) thermal conductivity. Smooth or polished surfaces of drawn glass, fused silica, glazed ceramic, Pyrex, quartz or sapphire favor reproducibility of sheet resistivity and the definition of thin lines.

It is important that the substrate does not interact with the film. Soda-lime glass, for example, is not suitable for use under high DC power because the sodium ions migrate to the negative terminal causing deterioration of the film. Other compositional factors, such as reactions to specific etchants and electrolytes, must be considered when pattern generation is accomplished by a technique involving photolithography.

The thermal conductivity of the substrate must also be considered. For example, the difference in ageing of resistors on glazed alumina and on glass is believed to result primarily from differences in temperature due to the high thermal conductivity of alumina. Despite the importance of thermal conductivity, low-alkali glass is an important substrate material. Glass is favored by low cost and ease of division of large sheets into small single circuit sizes. Alumina and beryllia predominate where the highest electrical and thermal loads and the most severe stability requirements are encountered.

Once the resistor film and substrate material have been chosen, the design problem consists of establishing a geometric pattern of a given thickness which meets the resistor requirements of (a) stability with time and (b) electrical resistivity. A critical parameter affecting resistor stability is the temperature of the film. As the film temperature increases, the resistor becomes susceptible to thermal oxidation. The formation of an oxide on the surface of the film or diffusion of oxygen into the film increases its resistance.

In time, a resistor may drift from its initial resistance value, especially if operated at high temperatures. This effect is usually expressed as percent resistance change per unit time. Actually, the percent drift is not linear with time for several reasons. A thin-film resistor usually becomes more stable as it ages, partly due to self-limiting processes such as surface oxidation, which form protective layers.

As described in the patent to D. Gerstenberg, cited above, one of the most attractive features of tantalum nitride film resistors is their excellent stability. The impervious oxide film formed by anodization or heat treatment inhibits chemical changes, and the high recrystallization temperature inhibits mechanical annealing that might change the resistance. Thus, preageing of thin-film resistors (by oven ageing or by overload power dissipation) can greatly increase their stability.

There are, however, problems associated with high-temperature stabilization. High temperature thermal stabilization can cause oxidation of the termination areas to the extent that solderability is highly impaired. This is especially true of terminations comprising successive layers of "Nichrome" (a nickel-chromium alloy) and gold. Additionally, if the thermal process is performed prior to final trim anodization, the advantage gained by the thermal stabilization is greatly reduced, even if the final trim anodization is as little as 10 percent.

Another parameter which may affect thin-film resistor stability is film thickness. Since oxidation and oxygen diffusion more seriously affect the surface layers of a film, it is here where the greatest percentage change in resistance takes place. Therefore, the greatest effort in controlling the stability of a particular type of film should be expended in controlling the condition of the surface layer.

SUMMARY OF THE INVENTION

An object of the present invention is to provide thin-film resistors having improved stability-life performance.

Another object of the invention is to provide a method of producing thin-film resistors having a resistivity that varies progressively or stepwise with film thickness in a positive resistivity profile.

Still another object of the invention is to provide a multilayer thin-film having a resistivity which varies progressively with the layer having the highest resistivity being at the surface of the resistor.

In accordance with the present invention, thin-film resistors having variable or nonhomogeneous resistivity are produced which have a positive resistivity profile. It has been discovered that the stability-life performance of a thin-film resistor having a positive resistivity profile, i.e., a thin-film resistor which has higher resistivity at the film surface than adjacent to the substrate, is superior to a thin-film resistor which has homogeneous resistivity, i.e., a resistor which has substantially the same resistivity throughout.

In accordance with the present invention, thin-film resistors having a positive resistivity profile are obtained by:

a. decreasing the voltage from one level to a lower level during sputtering, and/or b. increasing the nitrogen concentration from one concentration to a higher concentration during vacuum deposition in the case where a nitrided film is used.

Actually, it is believed that sputtering voltage and nitrogen concentration are interrelated in controlling resistivity. Deposition rate during sputtering decreases with decreasing voltage. Thus, even at a constant gas concentration the interaction between nitrogen and the depositing film is greater at lower sputtering voltages.

BRIEF DESCRIPTION OF THE DRAWINGS

Other objects, advantages, features and aspects of the invention will be more readily understood from the following detailed description of specific embodiments and examples thereof, when considered in conjunction with the drawings in which.

DESCRIPTION OF THE PREFERRED EMBODIMENTS

The electrical resistance of thin-film resistors is dependent on both their geometry and structure. Films may be made thinner in order to decrease the substrate area required for resistors, but this results in reduced stability. The present invention has the feature of conserving substrate area by altering the resistivity-thickness structure of the thin-film to obtain a film having a positive resistivity profile. It has been found that the percentage of change in total resistance, due, for example, to surface oxidation, for a resistor having a positive resistivity profile is substantially lower than that for a resistor having homogeneous resistivity—thereby resulting in superior life-stability characteristics for a resistor having a positive resistivity profile.

Figure 1:
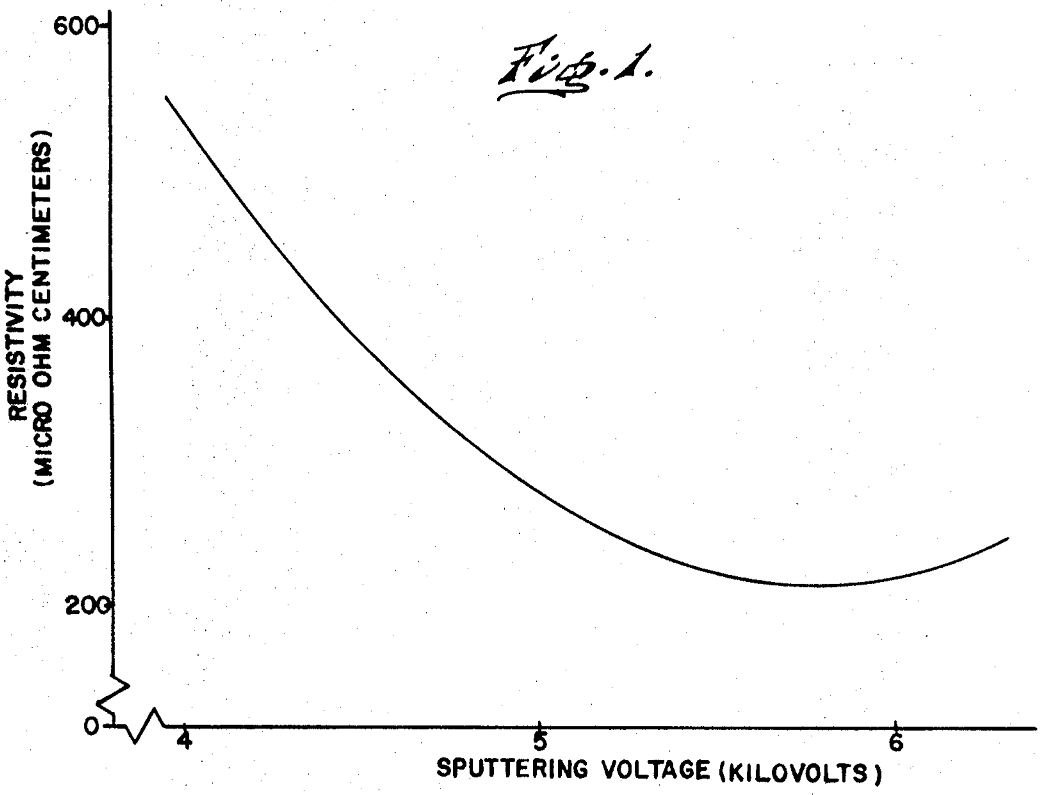
FIG. 1 is a graph illustrating the resistivity of tantalum nitride thin-films as a function of sputtering voltage.
Figure 2:
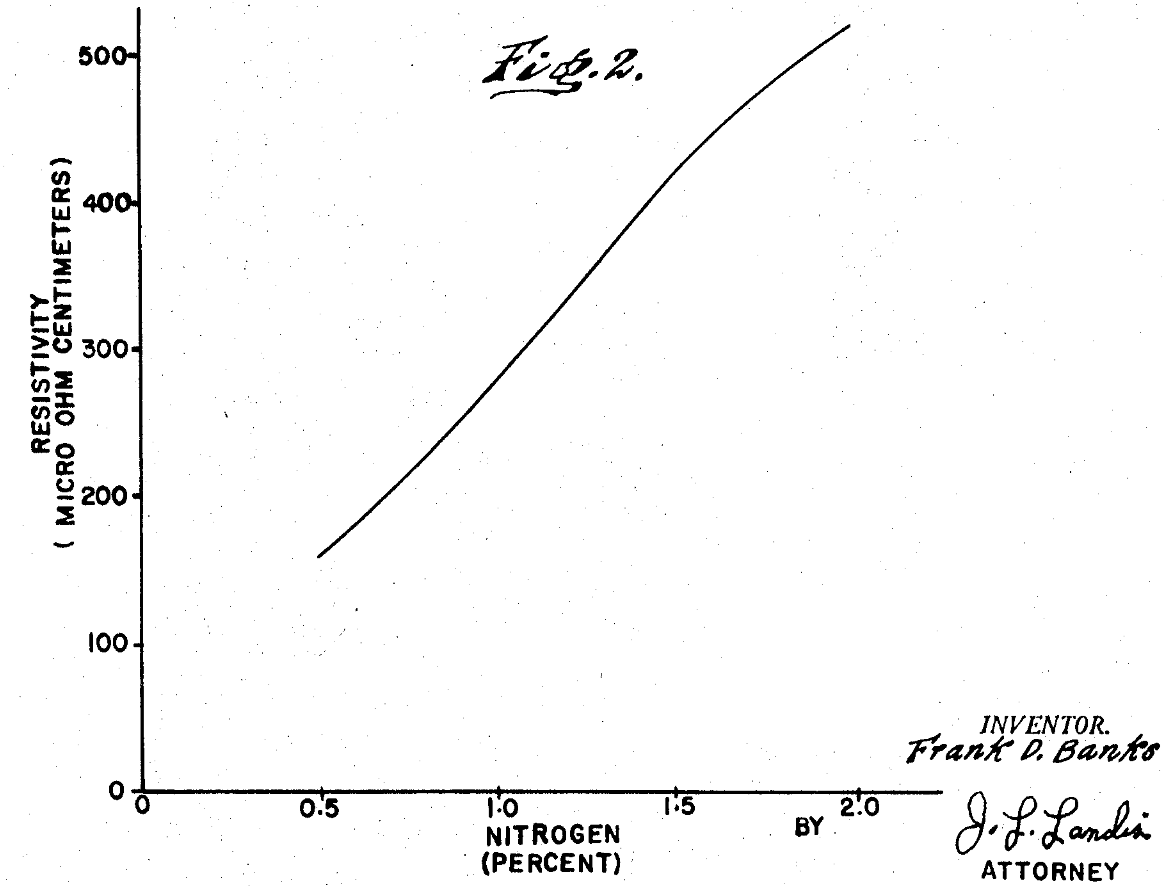
FIG. 2. is a graph illustrating the resistivity of tantalum nitride thin-films as a function of nitrogen concentration.

To obtain the desired resistivity profile, the resistor material is deposited on an electrically nonconductive, thermally conductive substrate while continuously or periodically varying a parameter which affects resistivity, e.g., voltage or nitrogen concentration. Specific resistivity generally changes inversely with sputtering voltage, i.e., the higher the voltage the lower the specific resistivity. As seen in FIG. 1 for a particular tantalum nitride film, for sputtering voltages between 4 and 5 kilovolts a 1 percent change in voltage results in approximately a 2.8 percent change in resistivity. FIG. 2 shows that resistivity, of a tantalum nitride film sputtered at a particular voltage, varies directly with nitrogen concentration and that a 1 percent change in nitrogen concentration results in approximately a 1.7 percent change in resistivity.

Normally, a sputtering voltage between 3.4 and 6 kilovolts is employed for depositing metal films. In accordance with the present invention the sputtering voltage is decreased either incrementally or continuously by mechanical or electromechanical means during sputtering until the desired thickness (generally between 500 and 20,000 angstroms) of the thin-film has been obtained. The lowest sputtering voltage which can be employed is the voltage necessary to effect glow discharge, i.e., the threshold voltage. The threshold voltage for tantalum, for example, is about 1,200 volts. However, since the rate of deposition varies directly with sputtering voltage, the lowest sputtering voltage which is normally practical is determined by economical considerations.

Typically, for tantalum or other nitrided films, the amount of nitrogen which is added during the vacuum deposition operation is between about 1 and about 4 percent. Since resistivity varies directly with nitrogen concentration, in accordance with the present invention the nitrogen concentration is increased either incrementally or continuously from one level of nitrogen concentration to a higher level of nitrogen concentration during the vacuum deposition operation.

In obtaining a thin-film with a positive resistivity profile, the overall sheet resistance of the film must be considered. The sheet resistance of a thin-film is directly proportional to the resistivity of the film material and inversely proportional to the film thickness. Thus, in thin-film resistors having variable resistivity with a positive resistivity profile, the layers of higher resistivity should be equal to or thinner than the layers having lower resistivity in order that the layers with the higher resistivity do not predominate in determining the overall resistance of the film, thereby detracting from the beneficial results achieved by the positive resistivity profile.

A thin-film resistor having a positive resistivity profile, i.e., a positive resistivity-thickness slope through its cross section, may be regarded as having a number of parallel paths for conduction. By placing the layer having the greatest conductivity adjacent to the substrate and the layer having the poorest conductivity adjacent to the outer surface of the resistor, a desirable balance is achieved between the effective resistance of the thin-film and its total current-carrying capacity. With this arrangement, the effect of damage to the upper layer, which is most susceptible to injury and oxidation, upon the total resistance of the resistor is minimized.

The total resistance R of two resistors in parallel is the resistance of the first resistor ($R_1$) times the resistance of the second resistor ($R_2$) divided by the sum of the resistances of both resistors ($R_1$ and $R_2$). Accordingly, a resistor having multiple layers of different resistivity, with the layer of lowest resistivity adjacent to the substrate and the layer of highest resistivity on the outer surface, will exhibit less resistance change for each reduction in thickness than a resistor of homogeneous resistivity. For example, using parallel resistors as an analogy, it can be shown that a film with nonhomogeneous resistivity such that the resistivity for each successive 50-angstrom layer is greater than the previous layer by a factor of 1.05454 will have a resistance change of 1.817 percent for the first 50 angstroms reduction in thickness as compared to a 3.44 percent resistance change for the same amount of thickness reduction in a resistor having homogeneous resistivity, i.e., a resistor having a resistivity-thickness slope of 0.

A fuller understanding of the invention will be obtained from the following examples. It is to be understood that these examples are for illustrative purposes only and are not intended as limiting.

Example I

Using a bell-jar sputter, tantalum nitride was deposited onto a ceramic substrate by sputtering under the following conditions:

5.7 kilovolts at 32 ma. for 7 minutes in an atmosphere having a nitrogen to argon ratio of about 1.30 percent. The thickness of the resulting film was 1135 angstroms and the thin-film has a resistivity of 220 micro-ohm centimeters.

When the identical procedure was followed with the exception that the voltage was lowered to 4.6 kilovolts the thickness of the resulting film was 1013 angstroms and the film had a resistivity of 341 micro-ohm centimeters.

Example II

Using a bell-jar sputterer, tantalum nitride was deposited onto a ceramic substrate by sputtering under the following conditions:

5.0 kilovolts at 32 ma. for 7 minutes at a nitrogen to argon ratio of 0.606 percent. The thickness of the resulting film was 1119 angstroms and the film had a resistivity of 179 micro-ohm centimeters.

When the identical procedure was followed with the exception that the nitrogen to argon ratio was increased to 1.51 percent, the thickness of the resulting film was 1002 angstroms and the film had a resistivity of 257 micro-ohm centimeters.

Example III

A bell-jar vacuum sputtering system (Cooke machine) was employed to sputter one layer of tantalum nitride over another onto a glass substrate. The resistivity of the bottom layer was determined to be 130 micro-ohm centimeters whereas the resistivity of the upper layer was found to be 570 micro-ohm centimeters. The effective resistivity of both layers was 205 micro-ohm centimeters and the overall thickness of the two layers was 1331 angstroms.

A single layer of tantalum nitride 1269 angstroms thick was then produced by sputtering at 3.9 kv. and 0.35 amps for 452 seconds in an argon nitrogen atmosphere on a glass substrate. The resistivity of the single layer film was 570 micro-ohm centimeters.

The two films (the multilayer film and the single layer film) were then aged for 5 hours at a temperature of 250° C. At the end of the 5-hour aging period, the films were subjected to 368 hours of a DC load of 1 watt. The percentage change in resistivity for the multiple layer film was about 0.44 percent. The percentage change in resistivity for the single layer film was 1.1 percent.

Thus, in accordance with the present invention the life-stability performance for a multilayer thin-film resistor having a positive resistivity profile is superior to a thin-film resistor possessing the same resistivity as the top layer in the multilayer resistor.

It will be understood that various modifications can be made without departing from the invention.

What I claim is:

1. A thin-film resistor comprising:

a. a substrate; and b. a resistive thin film of tantalum nitride on said substrate, said resistive thin film having multiple layers wherein the resistivity varies from layer to layer and the layer at the surface of the resistor, furthest from the substrate, has the highest resistivity.

2. A tantalum nitride thin-film resistor comprising:

a. a substrate; and b. a tantalum nitride thin film on said substrate, said tantalum nitride thin film having a resistivity which varies progressively from a low resistivity closest to the substrate to a higher resistivity furthest from said substrate.